(12) United States Patent
Kuwajima

(10) Patent No.: US 7,454,194 B2
(45) Date of Patent: Nov. 18, 2008

(54) MOBILE TERMINAL WITH PERSONAL AUTHENTICATION FUNCTION AND MOBILE TERMINAL SYSTEM

(75) Inventor: Hidenori Kuwajima, Hiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 510 days.

(21) Appl. No.: 10/808,332

(22) Filed: Mar. 25, 2004

(65) Prior Publication Data

US 2004/0192256 A1 Sep. 30, 2004

(30) Foreign Application Priority Data

Mar. 28, 2003 (JP) .............................. 2003-092095

(51) Int. Cl.
*H04M 1/66* (2006.01)
(52) U.S. Cl. ..................................... 455/411; 455/410
(58) Field of Classification Search ................ 455/410, 455/411, 404.2, 456.5, 456.6, 550.1, 423, 455/517, 561, 565, 456.4; 713/186, 200, 713/202; 340/539.31, 539.32, 540–542, 340/5.3, 5.31, 5.8, 5.86; 379/93.02, 93.03; 235/91 E; 380/270, 247; 726/17.21
See application file for complete search history.

(56) References Cited

U.S. PATENT DOCUMENTS

| | | | | |
|---|---|---|---|---|
| 5,600,708 | A * | 2/1997 | Meche et al. ................ | 455/411 |
| 5,862,472 | A * | 1/1999 | Park ............................ | 455/411 |
| 5,991,617 | A * | 11/1999 | Powell ........................ | 455/410 |
| 6,662,023 | B1 * | 12/2003 | Helle .......................... | 455/558 |
| 6,819,219 | B1 * | 11/2004 | Bolle et al. ................. | 340/5.52 |
| 6,915,123 | B1 * | 7/2005 | Daudelin et al. ............ | 455/410 |
| 7,010,699 | B1 * | 3/2006 | Agarwal et al. ................ | 726/5 |
| 2002/0052192 | A1 * | 5/2002 | Yamazaki et al. ........... | 455/411 |
| 2002/0111213 | A1 | 8/2002 | McEntee et al. | |
| 2003/0023882 | A1 * | 1/2003 | Udom ........................ | 713/202 |
| 2003/0129964 | A1 * | 7/2003 | Kohinata et al. ............ | 455/411 |
| 2004/0059915 | A1 * | 3/2004 | Laniepce et al. ............ | 713/169 |
| 2004/0063423 | A1 * | 4/2004 | Kagay, Jr. .................. | 455/410 |
| 2006/0058064 | A1 * | 3/2006 | Satou ........................ | 455/558 |

FOREIGN PATENT DOCUMENTS

| | | | |
|---|---|---|---|
| JP | 06-125305 | A | 5/1994 |
| JP | 09-191342 | A | 7/1997 |
| JP | 2001-236585 | A | 8/2001 |
| JP | 2001-275163 | A | 10/2001 |
| JP | 2001-345925 | A | 12/2001 |
| JP | 2002-218542 | A | 8/2002 |
| JP | 2002-261914 | A | 9/2002 |
| JP | 2002-374346 | A | 12/2002 |
| JP | 2003-274006 | A | 9/2003 |

* cited by examiner

*Primary Examiner*—George Eng
*Assistant Examiner*—Nam Huynh
(74) *Attorney, Agent, or Firm*—Birch, Stewart, Kolasch & Birch, LLP

(57) ABSTRACT

A mobile terminal of the present invention have a personal authentication function and a communication function for bi-directionally communicating with a communication base station. The mobile terminal includes a personal authentication information storing section, an identity information inputting section for inputting identity information of a current user, a personal authentication section which checks authenticity of the inputted identity information, and an informing section which transmits the result of the check of the authenticity of the identity information to the communication base station.

10 Claims, 6 Drawing Sheets

| ID | 01234567 |
|---|---|
| NAME | ○○ ×× |
| MOBILE TERMINAL PHONE NUMBER | 090-XXXX-XXXX |
| EMERGENCY CONTACT ADDRESS | XX,XX-CHO,YAMATO-KORIYAMA CITY,NARA |
| SEPARATE PHONE NUMBER | 0743-XX-XXXX |
| LAST COMMUNICATION (RECEPTION)TIME | 20XX/XX/XX XXhXXmXXs |
| AUTHENTICATION FAILURE INFORMATION RECEPTION TIME | 20XX/XX/XX XXhXXmXXs |

…

MOBILE TERMINAL WITH PERSONAL AUTHENTICATION FUNCTION AND MOBILE TERMINAL SYSTEM

CROSS-REFERENCE TO RELATED APPLICATION

This Nonprovisional application claims priority under 35 U.S.C. § 119(a) on Patent Application No. 2003-092095 filed in Japan on Mar. 28, 2003, the entire contents of which are hereby incorporated by reference.

BACKGROUND OF THE INVENTION

1. Field of the Invention

The present invention relates to a mobile terminal with a personal authentication function and a mobile terminal system. More specifically, the invention relates to a mobile terminal with a personal authentication function and a mobile terminal system, which prevent the unauthorized use of the mobile terminal by an unauthorized person when the mobile terminal is stolen or lost.

2. Description of the Related Art

In recent years, mobile terminals such as mobile phones and mobile devices have become more popular, and the easy-to-operate feature thereof has been improved drastically. On the other hand, such a mobile terminal is portable with no physical connection and, therefore, likely to be stolen or lost. Hence, there is a possibility that the stolen or lost mobile terminal is possessed and used by an unauthorized person against the will of the owner of the mobile terminal.

For prevention of the unauthorized use by the unauthorized person, there is known a so-called mobile terminal locking technique, which disables some or all of the functions of the mobile terminal when the owner finds the mobile terminal missing (see, for example, Japanese Unexamined Patent Publication No. HEI 6(1994)-125305).

This technique makes it possible to remotely control the mobile terminal from a communication device other than the mobile terminal so as to lock the mobile terminal. This technique prevents the unauthorized use of the missing mobile terminal by the unauthorized person.

However, this technique is based on the presumption that action is taken after the owner finds the mobile terminal stolen or lost. Therefore, the unauthorized use of the mobile terminal by the unauthorized person cannot be prevented during a period from a time point at which the mobile terminal is lost to a time point at which the mobile terminal is found lost. That is, it is impossible to promptly take action.

To cope with this, a technique for promptly taking action against the unauthorized use has been developed (see, for example, Japanese Unexamined Patent Publication No. HEI 9(1997)-191342). FIG. 8 illustrates the construction of a mobile terminal system according to the prior art.

In this technique, a position registration terminal 32 for a mobile terminal 31 is preliminarily provided separately from the mobile terminal 31. The mobile terminal 31 and the position registration terminal 32 constantly transmit positional information to a communication base station 33. If a distance between the mobile terminal 31 and the position registration terminal 32 is greater than a predetermined distance, the communication base station 33 transmits information on this fact to the owner of the mobile terminal. This technique makes it possible to promptly detect the steal or loss of the mobile terminal. Upon reception of the information, the owner of the mobile terminal requests the communication base station to lock the mobile terminal, whereby the unauthorized use of the mobile terminal by an unauthorized person can be prevented.

Where the position registration terminal provided separately from the mobile terminal is carried together with the mobile terminal, however, the convenient portability feature is deteriorated. This is a great disadvantage in view of a recent major challenge to the size reduction and weight reduction of the mobile terminal.

Even if the position registration information from the mobile terminal and the position registration terminal is updated as frequently as possible in consideration of power consumption, the unauthorized use of the lost mobile terminal within the coverage of the same communication base station cannot be prevented.

SUMMARY OF THE INVENTION

In view of the foregoing, it is a feature of the present invention to provide a personal authentication function to a mobile terminal to prevent the unauthorized use of the mobile terminal by an unauthorized person when. the mobile terminal is stolen or lost and possessed by the unauthorized person.

An embodiment of the present invention provides a mobile terminal having a personal authentication function and a communication function for bi-directionally communicating with a communication base station, the mobile terminal comprising: a personal authentication information storing section for storing personal authentication information; an identity information inputting section for inputting identity information of a current user of the mobile terminal for identification of an authentic user of the mobile terminal; a personal authentication section which checks authenticity of the identity information inputted from the identity information inputting section on the basis of the personal authentication information stored in the personal authentication information storing section for personal authentication; and an informing section which transmits an authentication result to the communication base station if the personal authentication is failed as the result of the check of the authenticity of the identity information by the personal authentication section.

According to an embodiment of the present invention, when the identity information for the personal authentication is inputted from the identity information inputting section, the authenticity of the inputted identity information is checked for the personal authentication on the basis of the preliminarily stored personal authentication information. If the personal authentication is failed as the result of the authenticity check, the authentication result is transmitted to the communication base station. The communication base station can take various actions, for example, for restricting the use of the mobile terminal or for communicating with the owner of the mobile terminal via a wire telephone. Thus, the unauthorized use of the mobile terminal by an unauthorized person can assuredly be prevented, even if the owner of the mobile terminal is not aware of the steal or loss of the mobile terminal.

DESCRIPTION OF THE PREFERRED EMBODIMENTS

Figure 1:
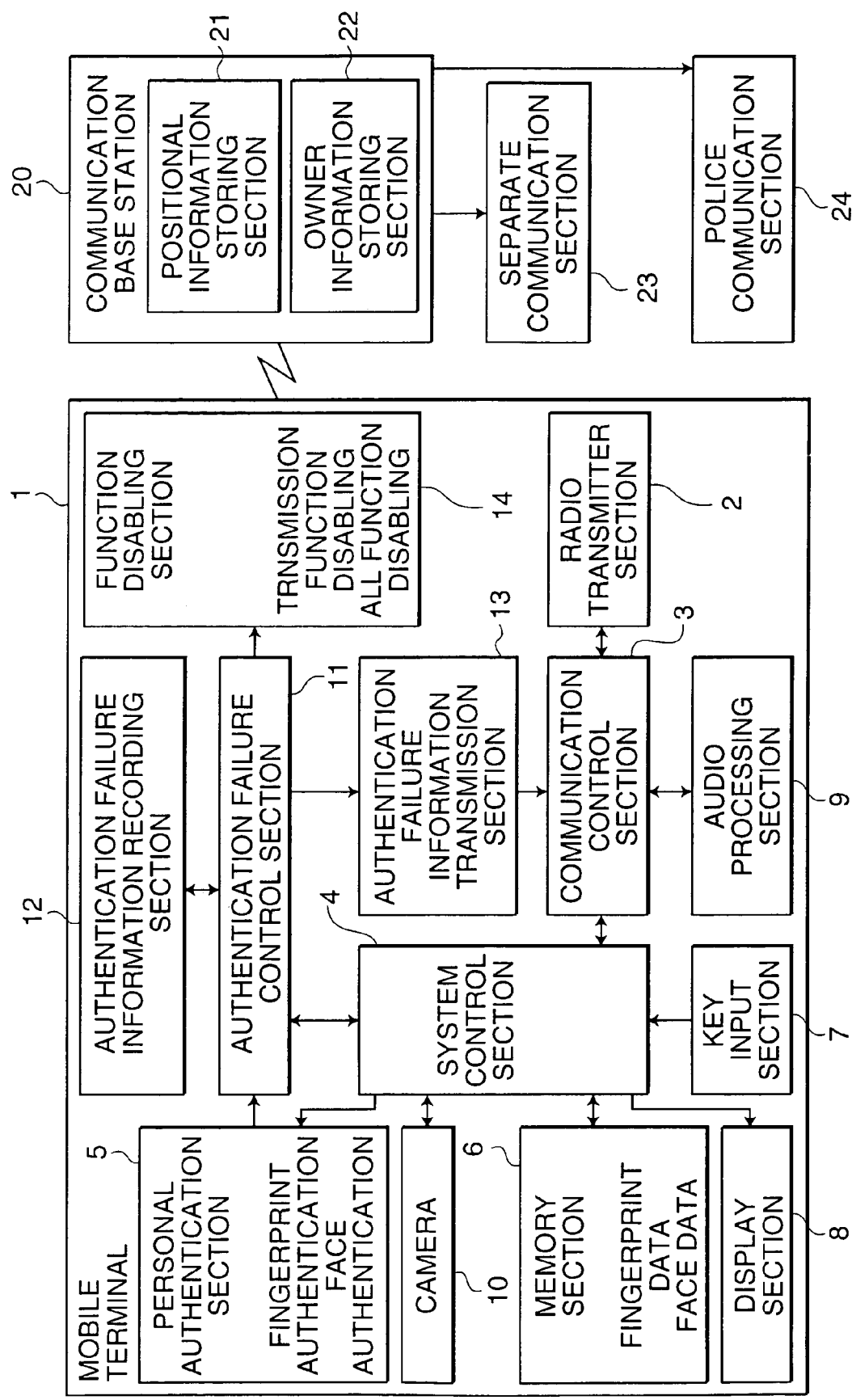
FIG. 1 is a block diagram illustrating the construction of an inventive mobile terminal system having a personal authentication function.

In an embodiment of the present invention, the personal authentication information storing section is capable of storing information for the personal authentication, and may comprise any of various storage media such as semiconductor memories, magnetic recording media and optical recording media known in the art. The personal authentication information storing section is desirably incorporated in the small size mobile terminal. To this end, it is desirable to employ a card memory or the like which is typically used as a recording medium for a digital camera.

The identity information inputting section is capable of inputting the identity information of the current user of the mobile terminal for the identification of the authentic user of the mobile terminal, and may comprise any of various input devices known in the art.

The identity information inputting section may comprise a fingerprint inputting section which inputs a fingerprint of the current user of the mobile terminal. The fingerprint inputting section may comprise a dactyloscopic sensor of a semiconductor type which detects the fingerprint of the user on the basis of the amount of charges in the sensor when a user's finger is put on the dactyloscopic sensor. The identity information inputting section may comprise a camera for picking up a facial image of the current user of the mobile terminal. The camera may be a small size CCD camera which can be incorporated in the mobile terminal.

Where the identity information inputting section comprises the fingerprint inputting section, fingerprint information is stored as the personal authentication information in the personal authentication information storing section, and the personal authentication is achieved by comparing fingerprint information detected by the dactyloscopic sensor with the fingerprint information stored in the personal authentication information storing section. Where the identity information inputting section comprises the camera, facial image information is stored as the personal identity information in the personal authentication information storing section, and the personal authentication is achieved by comparing facial image information picked up by the camera with the facial image information stored in the personal authentication information storing section.

The personal authentication section is capable of checking the authenticity of the identity information inputted from the identity information inputting section on the basis of the personal authentication information stored in the personal authentication information storing section for the personal authentication. The personal authentication section may comprise any of various processors which are operative according to a program. A processor for the mobile terminal or a processor provided separately from the processor for the mobile terminal may be employed as the personal authentication section.

The informing section is capable of transmitting the authentication result to the communication base station if the personal authentication is failed as the result of the check of the authenticity of the identity information by the personal authentication section. The informing section may comprise any of various information transmitters known in the art. An information transmitter incorporated in the mobile terminal for ordinary information transmission is desirably employed as the informing section.

With reference to the attached drawings, the present invention will hereinafter be described in detail by way of an embodiment thereof. It should be understood that the invention be not limited to the embodiment, but various modifications may be made.

FIG. 1 is a block diagram illustrating the construction of an inventive mobile terminal system having a personal authentication function. The mobile terminal system includes a mobile terminal 1 and a communication base station 20.

The mobile terminal 1 is, for example, a mobile phone or a mobile device, and includes a radio transmitter section 2, a communication control section 3, a system control section 4, a personal authentication section 5, a memory section 6, a key input section 7, a display section 8, an audio processing section 9, a camera section 10, an authentication failure control section 11, an authentication failure information recording section 12, an authentication failure information transmission section 13, and a function disabling section 14.

The communication base station 20 includes a positional information storing section 21 which stores positional information indicative of the position of the mobile terminal 1 communicating with the communication base station 20, and an owner information storing section 22 which stores owner information such as the emergency contact phone number and address of the owner of the mobile terminal 1. The communication base station 20 further includes a separate communication section 23 for communicating with the owner of the mobile terminal 1, for example, via a wire telephone other than the mobile terminal 1, and a police communication section 24 for communicating with a police office.

The radio transmitter section 2 functions to convert electric wave signals into electric signals and vice versa for communications between the mobile terminal 1 and the communication base station 20 via a wireless circuit.

The communication control section 3 comprises a so-called base band processing circuit for communications, and typically functions as a modem and a channel codic.

When electric wave signals transmitted from the communication base station 20 are received, the electric wave signals are converted into electric signals (analog signals) via the radio transmitter section 2, and inputted into the modem.

The modem converts (demodulates) the received analog signals into digital signals, and applies the digital signal information to the subsequent channel codic. The channel codic processes the digital signal information through a specific digital processing operation specified by communication standards. In this embodiment, the channel codic is defined as functioning to separate and combine audio information signals and system control signals. Upon completion of the specific digital processing operation, the audio information signals and the system control signals are separated from each other, and applied to the audio processing section 9 and the system control section 4, respectively.

For transmission of electric wave signals, the channel codic combines system control signals from the system control section 4 and audio information signals from the audio processing section 9 and, after performing a specific digital processing operation, applies the resulting signals as transmission digital signals to the model.

The modem converts (modulates) the digital signals into analog signals, and transmits the analog signals as electric wave signals to the communication base station 20 via the radio transmitter section 2.

Required signals are transmitted between the mobile terminal 1 and the communication base station 20 in conformity with a communication protocol, whereby a connection between the mobile terminal 1 and the communication base station 20 is established for communications.

The system control section 4 includes a microprocessor and a temporary storage necessary for operation of the microprocessor, and is adapted to comprehensively control the mobile terminal 1. The system control section 4 is connected to the personal authentication section 5 which checks whether a current user of the mobile terminal 1 is an authentic user for personal authentication, the memory section 6 which stores information such as telephone address information and mails, the key input section 7 for inputting information to the mobile terminal, the display section 8 which displays personal information and the state of the system, the authentication failure control section 11 which controls the mobile terminal to perform a predetermined operation when the personal authentication is failed, and the camera 10.

The personal authentication section 5 does not employ a so-called password such as a combination of numerals, but utilizes a so-called biometric authentication technique for personal authentication based on biological information such as a fingerprint and facial image information. This significantly contributes to the improvement of the easy-to-operate feature and the security level. More specifically, a dactyloscopic authentication technique is employed for the personal authentication in this embodiment. Alternatively, a face authentication technique utilizing the camera 10 may be employed for the personal authentication.

There are several dactyloscopic authentication techniques including a semiconductor-type dactyloscopic authentication method which is adapted to detect a fingerprint on the basis of the amount of charges in a dactyloscopic sensor when a finger is put on the sensor. However, the dactyloscopic authentication technique to be employed in this embodiment is not particularly limited.

Therefore, the personal authentication section 5 includes a dactyloscopic sensor for reading fingerprint information, a memory for registration and storage of fingerprint data of the authentic user by a special authentic user registration method, and a comparator for comparing the fingerprint information read by the dactyloscopic sensor with the registered authentic user fingerprint data for the identification of the authentic user. Personal authentication result information outputted from the comparator is applied to the authentication failure control section 11.

It is conceivable that the mobile terminal 1 is used by a plurality of users including the owner. In this case, fingerprint data of new users may additionally be registered by the special authentic user registration method. The special authentic user registration method will be described later when a process flow is explained.

The memory section 6 includes a ROM which stores a program for the mobile terminal, and an FROM which stores information such as telephone address information and mails, and information is read out of and written into the memory section 6 by the system control section 4 as required.

The key input section 7 includes ten-keys and various mode keys, and is adapted to apply information inputted by operating the keys by the user of the mobile terminal to the system control section 4.

The display section 8 includes a dot matrix liquid crystal panel and drivers, and is adapted to display numbers inputted from the key input section 7, images indicative of various communication modes and icon images indicative of telephone operation states, and like information required by the mobile terminal in response to a command from the system control section 4.

The audio processing section 9 includes a D/A converter for converting audio information signals into sound, a filter and a speaker, and is adapted to output the sound converted from the audio information inputted from the communication control section 3 out of the mobile terminal. The audio processing section 9 is also adapted to perform an audio processing operation with the use of an A/D converter and a filter when sound is inputted from a microphone, and then apply the resulting audio information signals (digital signals) into the communication control section 3.

The authentication failure control section 11 is adapted to control an operation to be performed on the mobile terminal 1 when the personal authentication is failed, and is connected to the authentication failure information recording section 12, the authentication failure information transmission section 13 and the function disabling section 14.

The authentication failure information recording section 12 records how many times the personal authentication is failed or successfully achieved. In this embodiment, the authentication failure information recording section 12 is provided separately from the personal authentication section 5 and the memory section 6, but may be incorporated in the personal authentication section 5 and the memory 6.

Figures 6, 7:
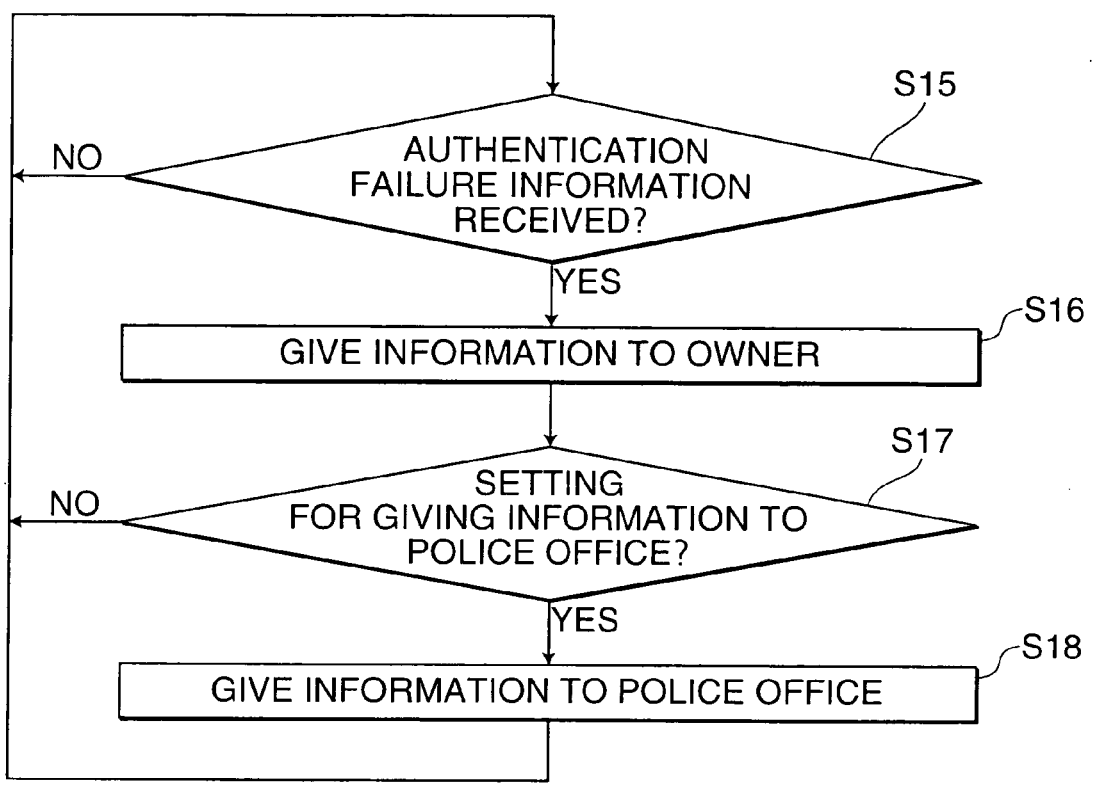
FIG. 6 is a flow chart illustrating an operation to be performed by a communication base station according to the embodiment.
FIG. 7 illustrates exemplary owner information stored on the side of the communication base station according to the embodiment.
Figure 8:
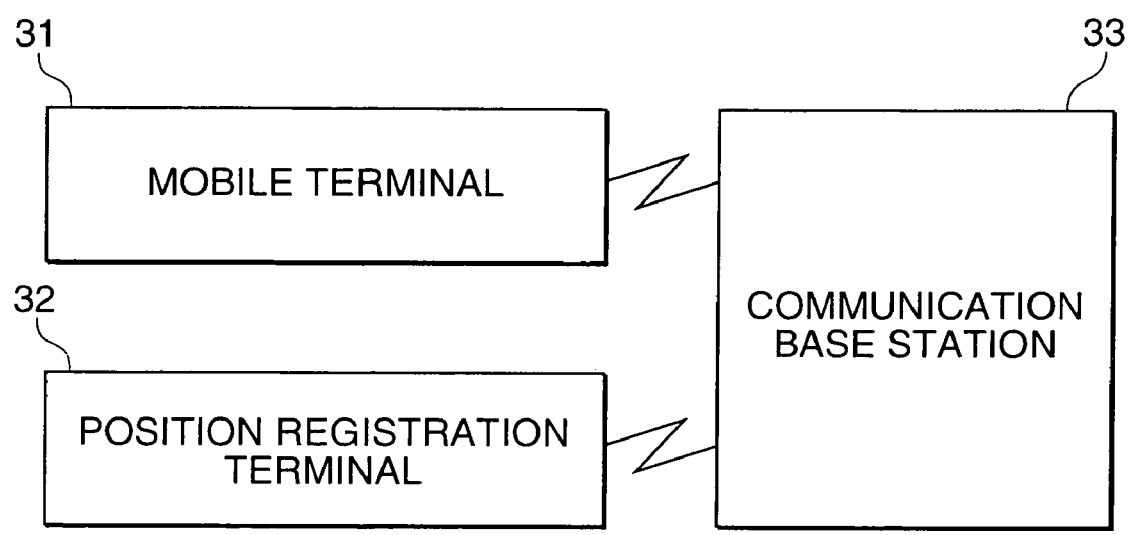
FIG. 8 is a diagram illustrating the construction of a conventional mobile terminal system.

In the subscription of the mobile terminal 1, the owner information such as the emergency contact phone number and address of the authentic user is preliminarily registered with a communication carrier which manages the communication base station 20. The owner information is stored in the owner information storing section 22. The communication carrier has the separate communication section 23 for communicating with the authentic user of the mobile terminal 1, for example, via a wire telephone other than the mobile terminal 1. The separate communication section 23 is capable of communicating with the authentic user with reference to the information stored in the owner information storing section 22. The registration of the owner information is not necessarily required to be made in the subscription of the mobile terminal, but may be made until the operation of the mobile terminal system is started. Exemplary owner information is shown in FIG. 7.

Figure 2:
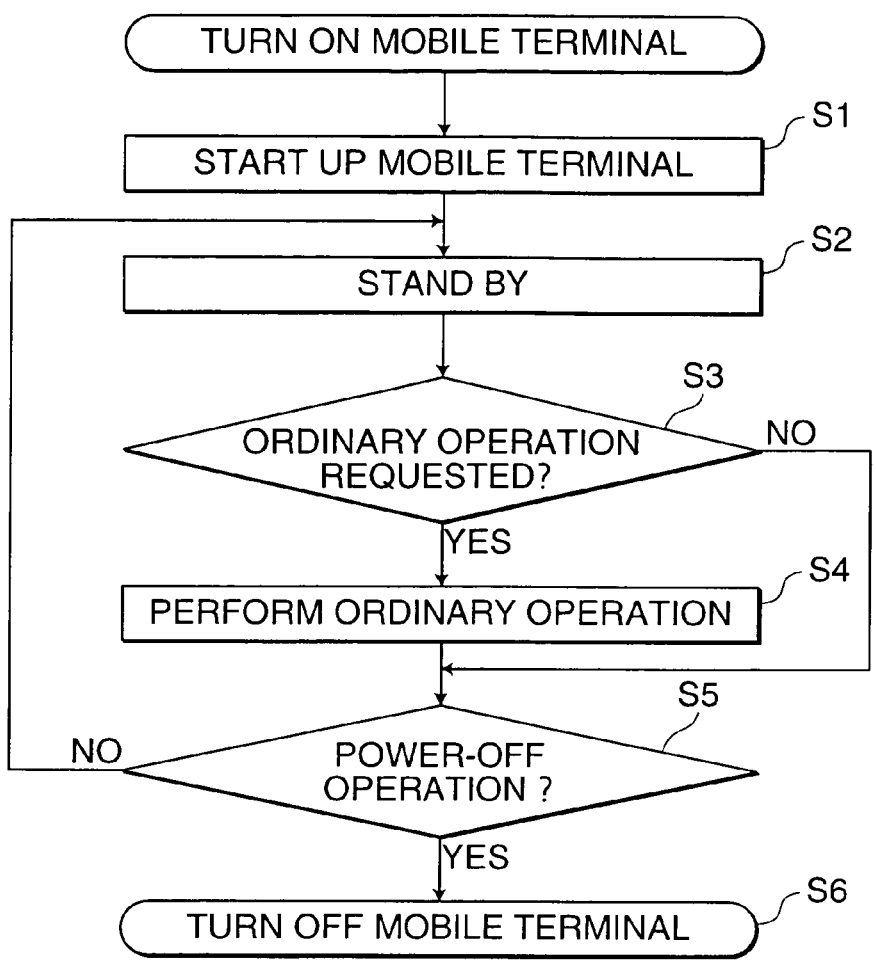
FIG. 2 is a flow chart illustrating a basic operation of a mobile terminal according to an embodiment of the present invention.

Next, an explanation will be given to operations to be performed by the mobile terminal system having the aforesaid construction. First, an exemplary process flow of the mobile terminal is shown in FIG. 2.

When the mobile terminal 1 is turned on by operating the key input section 7, a mobile terminal start-up operation is performed (Step S1). This operation includes a start-up operation for the mobile terminal per se as well as a predetermined operation such as cell search based on the communication protocol. Through the predetermined operation, communication with the communication base station 20 is started to establish a communicable state (Step S2). In this embodiment, this state is referred to as "stand-by state".

To give information on the stand-by state to the user, proper information may be displayed on the display section 8. For example, current time may be displayed by a clocking function typically incorporated in the mobile terminal. In general, the mobile terminal is used in the stand-by state.

If the mobile terminal 1 receives an operation request issued by operating the key input section by the user in the stand-by state (Step S3), the mobile terminal 1 performs an operation corresponding to the request (Step S4). In this embodiment, such an operation is referred to as "ordinary operation". If a request for starting phone communication is received, for example, the system control section 4 permits the phone communication by utilizing functions such as the communication control section 3, the radio transmitter section 2 and the audio processing section 9 necessary for the phone communication. If a request for displaying the address information is received, the system control section 4 reads necessary data out of the memory section 6 to display the data on the display section 8. The ordinary operation includes these operations which are generally performed by the mobile terminal.

If the key input section 7 is operated for turning off the mobile terminal 1 in the stand-by state (Step S5), the system control section 4 performs a mobile terminal power-off operation to turn off the mobile terminal 1 (Step S6). The mobile terminal is typically used in the aforesaid manner.

Figure 3:
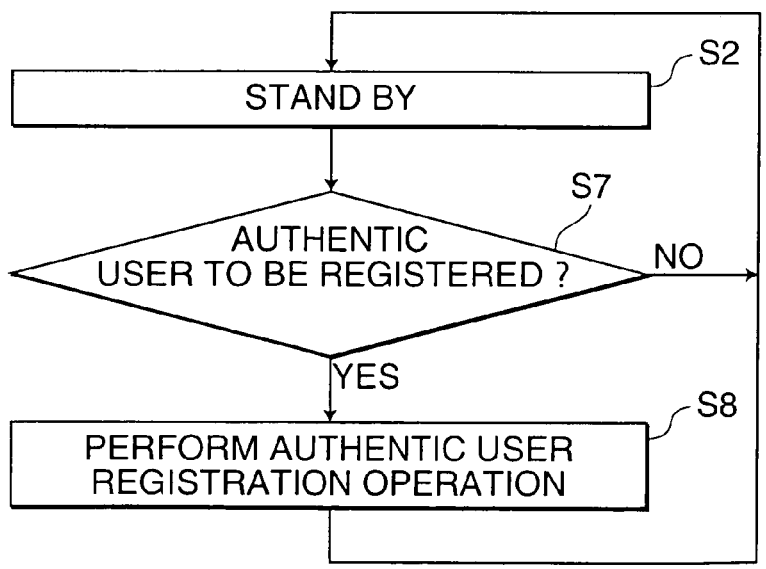
FIG. 3 is a flow chart illustrating an authentic user registration operation to be performed by the mobile terminal according to the embodiment.

Next, an explanation will be given to an authentic user registration operation to be performed in the present invention. FIG. 3 is a flow chart illustrating the authentic user registration operation.

If the authentic user is to be registered (Step S7) when the mobile terminal 1 is in the stand-by state (Step S2), the mobile terminal 1 performs the authentic user registration operation (Step S8). Particularly where the mobile terminal 1 is used for the first time, this operation is required.

The authentic user registration operation in Step S8 will hereinafter be described. The authentic user registration is herein a preparatory step for the personal authentication operation. The personal authentication operation is herein a step for checking whether a user currently operating the mobile terminal 1 is the authentic user or an unauthorized user in an attempt at unauthorized use for personal authentication. Since the personal authentication operation is repeatedly performed, the ease of the personal authentication operation is a very important subject in the present invention. To maintain a high level of security and facilitate the personal authentication operation, it is desirable to employ the dactyloscopic technique or the like which simply requires to put a finger on a specified place to facilitate the authentication operation without the need for cumbersome password input.

The authentic user registration is performed by the special method for preventing easy registration of an unauthorized user. The special method is a complicated method which cannot easily be guessed nor realized by the unauthorized user. For example, the authentic user registration may be performed by employing a longer password, or may be prohibited unless the mobile terminal 1 is connected to a second terminal prepared separately from the mobile terminal 1. It is not necessary to carry the longer password or the second terminal together with the mobile terminal 1 (it is rather desirable that the longer password or the second terminal do not have easy portability), but it is important for the owner to tightly manage the password and the second terminal. The authentic user registration operation thus improves the security by sacrificing the ease of the operation.

More specifically, the mobile terminal 1 verifies by the aforesaid special method that the current user of the mobile terminal is the authentic user. Then, fingerprint data of the authentic user is read by the personal authentication section 5, and stored in a memory. The memory may be the memory section 6 of the mobile terminal 1, or may separately be provided in the personal authentication section 5. However, the authentic user registration information should continuously be retained, even if the mobile terminal 1 is turned off. Without this arrangement, the easy-to-operate feature is drastically deteriorated. Upon completion of the authentic user registration operation, the process returns to Step S2 in which the mobile terminal 1 is in the stand-by state.

It is also conceivable that a plurality of users share the mobile terminal 1. In this case, the authentic user serves as the administrator of the mobile terminal 1, and new authentic users are additionally registered by the aforesaid special method with acknowledgment to the initially registered authentic user.

Figure 4:
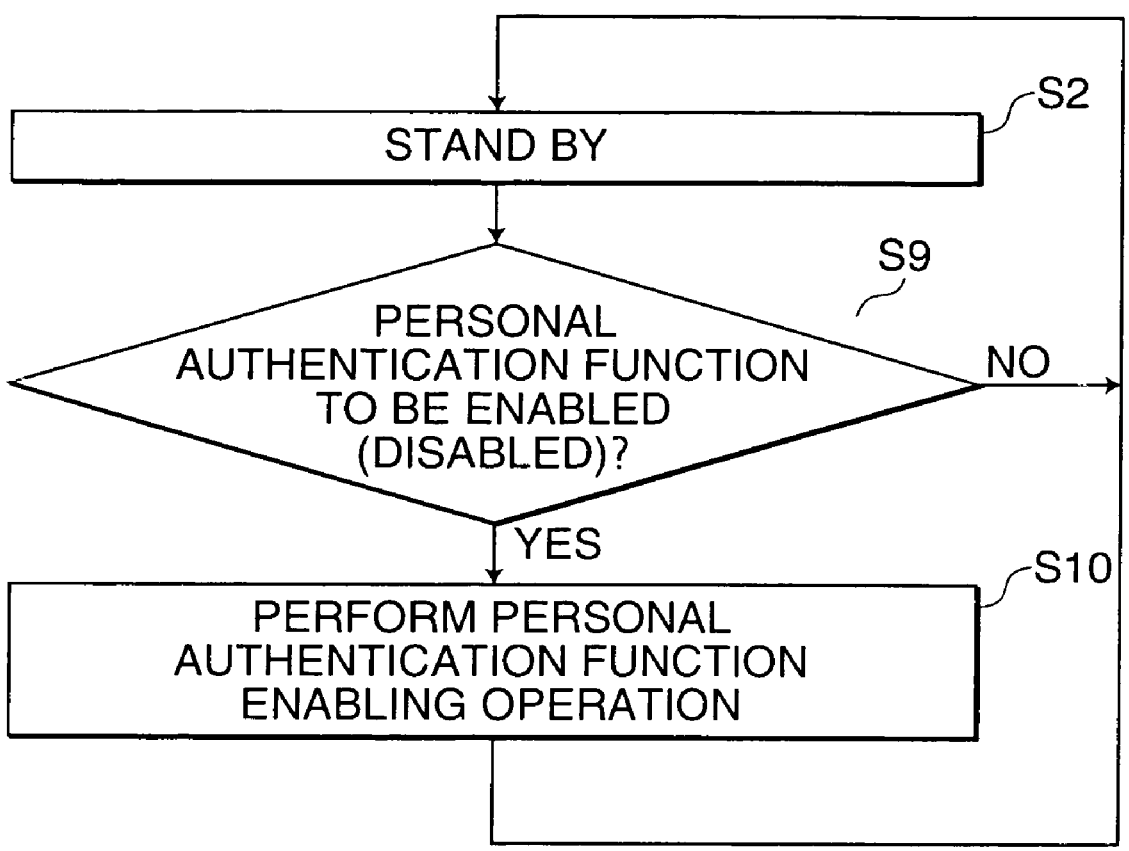
FIG. 4 is a flow chart illustrating a personal authentication function enabling operation to be performed by the mobile terminal according to the embodiment.

Next, an explanation will be given to an authentic user personal authentication function enabling operation in the present invention. FIG. 4 illustrates the flow of the authentic user personal authentication function enabling operation.

If the authentic user is already registered when the mobile terminal 1 is in the stand-by state (Step S2), the mobile terminal 1 is operated to enable or disable the personal authentication function (Step S9). For enabling the personal authentication function, the mobile terminal 1 performs the personal authentication function enabling operation (Step S10). In the personal authentication function enabling operation, flag (enable) information is set for selectively permitting the authentic user to perform the ordinary operation depending on the result of the personal authentication of the current user of the mobile terminal. The flag information is continuously retained even after the mobile terminal 1 is turned off. In the present invention, it is presumed that the personal authentication function is in effect. However, the personal authentication function may temporarily be disabled.

Figure 5:
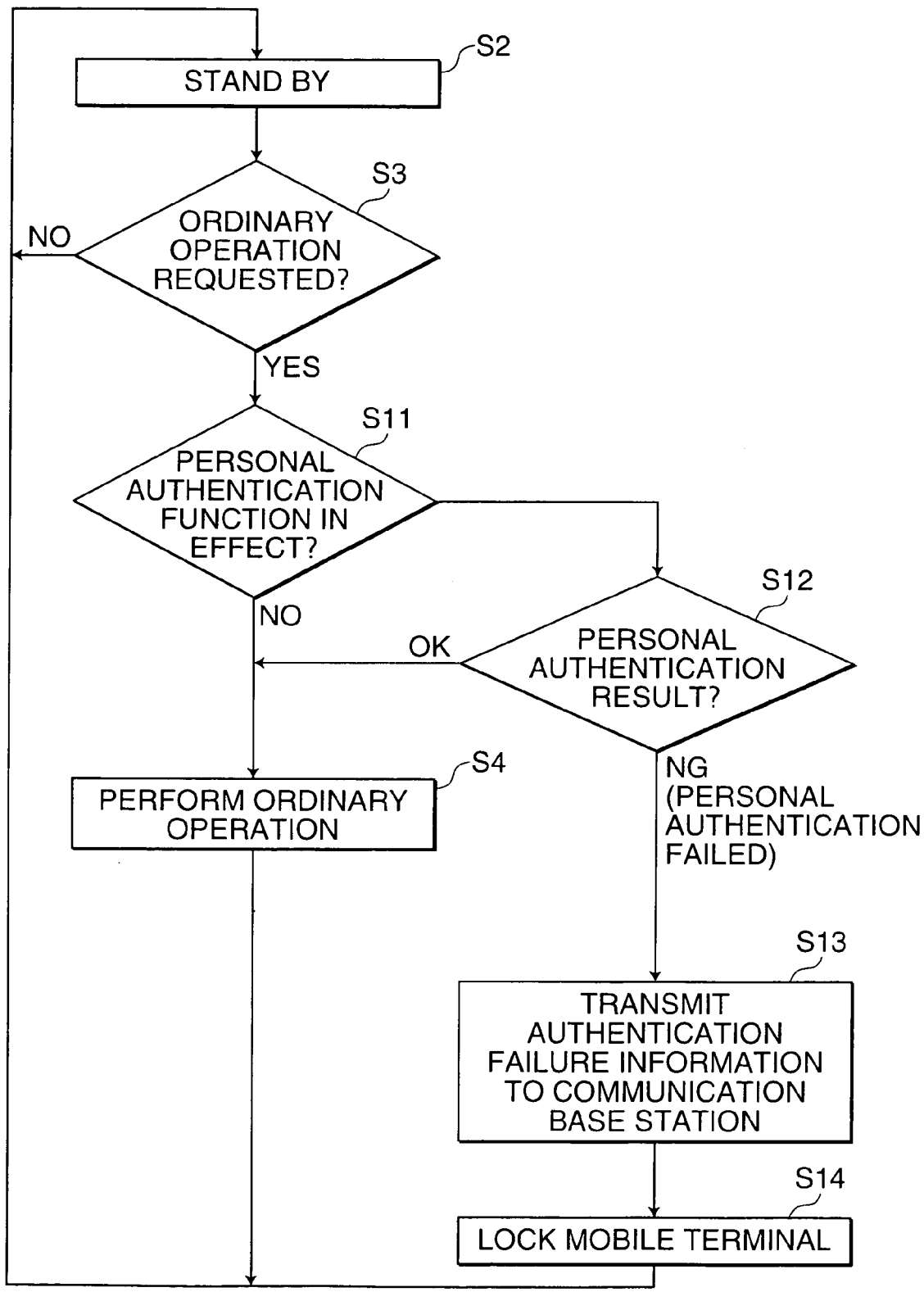
FIG. 5 is a flow chart illustrating an operation to be performed by utilizing the personal authentication function of the mobile terminal according to the embodiment.

Next, an explanation will be given to an operation to be performed by the mobile terminal 1 when the personal authentication function (which is a main feature of the present invention) is in effect. FIG. 5 illustrates a process flow when the personal authentication function is in effect.

The mobile terminal such as the mobile phone is generally used in the stand-by state in Step S2 for convenience. In this embodiment, the mobile terminal 1 performs the operation on the presumption that the mobile terminal 1 is in the stand-by state in the Step S2 after the authentic user is registered in Step S8 shown in FIG. 3.

When the user of the mobile terminal 1 operates the key input section 7 to perform the ordinary operation (Step S3), the system control section 4 judges whether the personal authentication is required for performing the requested ordinary operation. If the personal authentication is not required for the requested ordinary operation, the ordinary operation may directly be performed in Step S4. That is, the ordinary operation to be performed in this case is an operation requiring no security, for example, for display a calendar or for playing a game. Whether or not the personal authentication is required may be predetermined for each ordinary operation. In this case, even an unauthorized user who is not registered as the authentic user can utilize the ordinary operation without disabling the personal authentication function in Step S10 shown in FIG. 4. Thus, the easy-to-operate feature can be improved.

If the personal authentication is required for the ordinary operation requested in Step S3, it is checked whether the personal authentication function is in effect in Step S10 shown in FIG. 4 (Step S11). If the personal authentication function is not in effect, the requested ordinary operation is performed in Step S4. On the other hand, if the personal authentication function is in effect, the personal authentication operation (Step S12) is performed. In the personal authentication operation, an unauthorized user is prevented from using the mobile terminal 1, and only the authentic user is permitted to use the mobile terminal 1. In Step S12, information indicating that the personal authentication is required for performing the requested ordinary operation may be display on the display section 8.

In the personal authentication operation, the current user of the mobile terminal first inputs his or her fingerprint information to the personal authentication section 5. Then, the personal authentication section 5 compares the inputted fingerprint information with the fingerprint information of the authentic user preliminarily registered in Step S8 shown in FIG. 3 by the comparator to check the authenticity of the inputted fingerprint information. Information on the result of the authenticity check which indicates whether the current user is the authentic user or an unauthorized user having no registration (personal authentication result information) is applied to the authentication failure control section 11.

If the authentication result indicates that the current user is the authentic user, the process goes to Step S4 to perform the requested ordinary operation. If the authentication result indicates that the current user is an unauthorized user having no registration, the authentication failure control section 11 causes the authentication failure information transmission section 13 to transmit authentication failure information indicative of an authentication failure to the communication base station 20 (Step S13).

The authentication failure to be judged by the authentication failure control section 11 may be based on a plurality of negative authentication results (e.g., five consecutive negative authentication results) rather than on a single negative authentication result. That is, when the plural negative authentication results are consecutively given, the personal authentication failure is judged, and the process goes to Step S13. In this case, the number of the negative authentication results should be stored in the authentication failure information storing section 12. The owner of the mobile terminal 1 can specify the number of negative authentication results required for the judgment on the authentication failure.

Even if the authentication failure is judged, it is not necessarily required to immediately transmit the authentication failure information to the communication base station 20, but the authentication failure information may be once stored and transmitted to the communication base station 20 when the mobile terminal 1 is operated for transmission control.

The judgment on the authentication failure based on the plural negative authentication results and the transmission of the authentication failure information in the next transmission control are intended to prevent improper operation (to prevent unintended transmission of the authentication failure information).

Where the owner lends the mobile terminal 1 to his or her associate to shown information stored in the mobile terminal 1 without concern for the transmission of the authentication failure information to the communication base station 20, for example, there is a possibility that the personal authentication is failed and the authentication failure information is immediately transmitted to the communication base station. This imposes a load on the communication base station. Further, unnecessary information is transmitted to the owner, so that the convenient feature is deteriorated.

When the authentication failure is judged, the authentication failure control section 11 requests the authentication failure information transmission section 13 to transmit the authentication failure information to the communication base station 20. The authentication failure information transmission section 13 transmits the authentication failure information to the communication base station 20 through the communication control section 3 having the communication (transmission) function irrespective of an operation performed on the mobile terminal 1 by the user.

Further, the authentication failure control section 11 may perform a lock operation for restricting some or all of the functions of the mobile terminal 1 upon the judgment of the authentication failure (Step S14).

Though not shown, how a function restricting operation is to be performed on the mobile terminal 1 when the authentication failure information is received (i.e., when the mobile terminal 1 is supposedly used by an unauthorized user) is preliminarily inputted to the mobile terminal 1. The function restricting operation may be such that the communication control section 3 is disabled for prevention of communications and the browsing of the contents of the memory section 6 is prevented for prevention of the unauthorized use of the mobile terminal 1. The function disabling section 14 locks the mobile terminal 1 on the basis of the inputted information upon reception of the authentication failure information from the authentication failure control section 11.

At this time, a communication function and an address display function for the ordinary operation is locked (or disabled). Further, information on the locked functions may be displayed on the display section 8. Thus, the function restricting operation assuredly and promptly prohibits the unauthorized use of the mobile terminal, before the unauthorized user makes an attempt to use the mobile terminal 1.

The flow of an operation to be performed by the communication base station 20 when the authentication failure information is received is shown in FIG. 6. When the communication base station 20 receives the authentication failure information transmitted in Step S13 shown in FIG. 5 (Step S15), the communication base station 20 refers to the owner information preliminarily registered in the owner information storing section 22 and transmits the authentication failure information to the owner via the separate communication section 23 provided separately from the mobile terminal 1 (Step S16). Therefore, the authentic user can promptly obtain information on the steal or loss of the mobile terminal. Further, the positional information of the mobile terminal 1 stored in the positional information storing section 21 of the communication base station 20 may be added to the authentication failure information when the authentication failure information is transmitted to the owner. Thus, the owner can obtain the information on the position of the lost mobile terminal 1 and, hence, easily find the mobile terminal 1. On the basis of the positional information, the owner can guess whether the mobile terminal 1 is simply lost or stolen by an unauthorized person.

If information is to be given to a police office for further improvement of the security (Step S17), the communication base station 20 informs the police office about the steal of the mobile terminal via the police communication section 24 (Step S18) upon reception of the authentication failure information. The authentic user of the mobile terminal 1 may make a setting on whether or not the information is to be given to the police office, and change the setting at any time. If there is no need to give the information to the police office, a setting for giving no information to the police office is made on the side of the communication base station 20.

Thus, the personal authentication function of the mobile terminal prevents unauthorized use of the mobile terminal lost or stolen and currently possessed by an unauthorized user.

According to the present invention, even if the mobile terminal is stolen or lost and currently possessed by an unauthorized user, the unauthorized use of the mobile terminal by the unauthorized user can assuredly be prevented. Further, the authentic user can promptly obtain information from the communication base station to promptly find the steal or loss of the mobile terminal. If the information transmitted from the communication base station includes the positional information of the mobile terminal communicating with the communication base station, the positional information is useful for finding the lost mobile terminal and guessing whether the mobile terminal is stolen or lost.

What is claimed is:

1. A mobile terminal system having a personal authentication function and a communication function for bi-directionally communicating with a communication base station, comprising:
   a personal authentication information storing section for storing personal authentication information;
   an identity information inputting section for inputting identity information of a current user of the mobile terminal for identification of an authentic user of the mobile terminal;
   a personal authentication section which checks authenticity of the identity information inputted from the identity information inputting section on the basis of the personal authentication information stored in the personal authentication information storing section for personal authentication;
   an informing section which transmits an authentication result to the communication base station if the personal authentication is failed as the result of the check of the authenticity of the identity information by the personal authentication section; and
   a communication base station which bi-directionally communicates with the mobile terminal,
   wherein the communication base station comprises:
   an owner information storing section which stores owner information including a name and a wire phone number of an owner of the mobile terminal; and
   an owner-addressed authentication result informing section which, upon reception of a personal authentication failure result from the mobile terminal, transmits the personal authentication failure result to the owner with reference to the owner information stored in the owner information storing section.

2. A mobile terminal system as set forth in claim 1, wherein the personal authentication information stored in the personal authentication information storing section is fingerprint information,
   wherein the identity information inputting section comprises a fingerprint inputting section which inputs a fingerprint of the current user of the mobile terminal,
   wherein the personal authentication section checks authenticity of the fingerprint inputted from the fingerprint inputting section on the basis of the fingerprint information stored in the personal authentication information storing section.

3. A mobile terminal system as set forth in claim 1,
   wherein the personal authentication information stored in the personal authentication information storing section is facial image information,
   wherein the identity information inputting section comprises a camera for picking up a facial image of the current user of the mobile terminal,
   wherein the personal authentication section checks authenticity of the facial image picked up by the camera on the basis of the facial image information stored in the personal authentication information storing section.

4. A mobile terminal system as set forth in claim 1, wherein the communication base station further comprises a predetermined-organization-addressed authentication result informing section which, upon reception of the personal authentication failure result from the mobile terminal, transmits the personal authentication failure result to a predetermined organization.

5. A mobile terminal system as set forth in claim 1, wherein the communication base station further comprises a positional information adding section which adds positional information indicative of a position of the mobile terminal communicating with the communication base station to the personal authentication failure result when the owner-addressed authentication result informing section or the predetermined-organization-addressed authentication result informing section transmits the personal authentication failure result to the owner or the predetermined organization.

6. A mobile terminal system as set forth in claim 4, wherein the communication base station further comprises a positional information adding section which adds positional information indicative of a position of the mobile terminal communicating with the communication base station to the personal authentication failure result when the owner-addressed authentication result informing section or the predetermined-organization-addressed authentication result informing section transmits the personal authentication failure result to the owner or the predetermined organization.

7. A mobile terminal system as set forth in claim 1 wherein said mobile terminal further includes a function disabling section which disables some or all of communication functions after the informing section transmits the authentication result to the communication base station.

8. A mobile terminal system as set forth in claim 7, wherein said function disabling section automatically disables some or all of communication functions after the informing section transmits the authentication result to the communication base station.

9. A mobile terminal system as set forth in claim 1 wherein said mobile terminal further includes:
   an authentication result storing section for storing an authentication failure result if the personal authentication is failed with the identity information; and
   an authentication failure control section which performs a control operation if the personal authentication is failed with the identity information,
   wherein the authentication failure control section controls the informing section to transmit the authentication failure result stored in the authentication result storing section to the communication base station when the current user attempts to use the mobile terminal communication function.

10. A mobile terminal system as set forth in claim 1 wherein said mobile terminal further includes:
    an authentication result storing section for storing an authentication failure result if the personal authentication is failed with the identity information; and
    an authentication failure control section which performs a control operation if the personal authentication is failed with the identity information,
    wherein the authentication failure control section controls the informing section to transmit the authentication failure result stored in the authentication result storing section to the communication base station only after the personal authentication has failed a predetermined number of times greater than one.

* * * * *